Patented May 19, 1953

2,639,270

UNITED STATES PATENT OFFICE 2,639,270

STYRENE MODIFIED ALKYD RESINS

Gerald A. Griess, Midland, Mich., and Carl V. Strandskov, Des Moines, Iowa, assignors to The Dow Chemical Company, Midland, Mich., a corporation of Delaware No Drawing. Application April 28, 1949, Serial No. 90,263

11 Claims. (Cl. 260—22)

This invention concerns certain new resinous film forming compositions and a method of making the same. It relates more particularly to styrene modified alkyd resins from the polyhydroxy esters of resinous styrenated-drying oil acid interpolymers and a polyhydric alcohol, by reaction of the resinous esters containing free hydroxyl groups with phthalic acid or phthalic anhydride.

According to the invention the new resinous film forming compositions may be prepared by interpolymerizing one or more monovinyl aromatic compounds having the general formula:

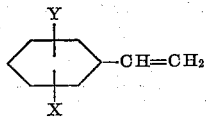

wherein X and Y represent the same or different members of a group consisting of hydrogen and lower alkyl radicals containing not more than 3 carbon atoms, an alpha-methylene alkyl aromatic compound having the general formula:

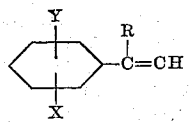

wherein X and Y have the meaning just given and R is an alkyl radical containing not more than 2 carbon atoms, and a drying oil fatty acid, or a mixture of drying oil fatty acids, esterifying the interpolymer with a polyhydric alcohol so as to form a resinous ester containing free hydroxyl groups and thereafter reacting the polyhydroxy ester with phthalic acid, or phthalic anhydride.

The new resinous film forming compositions are condensation products of resinous polyhydroxy esters and a polybasic acid and may be considered as a new type of styrene modified alkyd resin. The products are all soluble in toluene and are useful in the manufacture of coating compositions such as varnish and enamels. Films of the resinous compositions dry in air, or by baking, to form tough, hard coatings having good adhesion to metal, excellent durability and good resistance to mineral spirits, e. g. gasoline, and to aqueous solutions of soap and alkali.

It is important in preparing the new resinous compositions that the various ingredients be added to the reaction mixture in a certain order and that the polymerizable starting materials be used in certain relative proportions. Best results are obtained when the drying oil fatty acid, or mixture of drying oil fatty acids, the monovinyl aromatic compound and the alpha-methylene alkyl aromatic compound are first substantially completely interpolymerized to a single phase, i. e. to a clear resinous product, the interpolymer is then reacted with a polyhydric alcohol to neutralize the carboxylic acid groups of the drying oil fatty acid and form a resinous ester containing free hydroxyl groups and the polyhydroxy ester is thereafter reacted with phthalic acid, or phthalic anhydride.

We have also observed that resinous film forming compositions having greater solubility in toluene and other usual varnish solvents, are obtained when the polymerizable starting materials contain both a monovinyl aromatic compound, e. g. styrene, and an alpha-methylene alkyl aromatic compound, in certain relative proportions as hereinafter specified, than when styrene, or a nuclear substituted styrene, alone is the polymerizable component. The alpha-methylene alkyl aromatic compound appears to not only modify the rate of polymerization but also to interpolymerize with the drying oil fatty acid and the styrene, or nuclear-substituted styrene. It reduces the tendency, when using highly conjugated drying oil fatty acids in the polymerization mixture, toward formation of highly cross-linked interpolymers, which interpolymers on subsequent reaction with a polyhydric alcohol and phthalic acid, or phthalic anhydride, form styrene modified alkyd resins which are insoluble in toluene and other usual varnish solvents and are therefore unsuitable as resinous film forming compositions.

Any drying oil fatty acid or mixture of drying oil fatty acids containing conjugated, or non-conjugated olefinic linkages may be employed as starting materials in preparing the new resinous film forming compositions. Examples of suitable drying oil acids are linseed oil fatty acids, dehydrated castor oil fatty acids, tung oil fatty acids, perilla oil fatty acids, oiticica oil fatty acids, and fish oil fatty acids such as sardine oil fatty acids, or menhaden oil fatty acids. Mixtures of such drying oil fatty acids, or mixtures of highly conjugated drying oil fatty acids and non-conjugated semi-drying oil fatty acids, e. g. a mixture of equal parts by weight of tung oil fatty acids and soybean oil fatty acids, may also be used. The drying oil fatty acids are prepared by saponification of the corresponding drying oils and may be purchased in commercial quantities.

As the monovinyl aromatic compound starting material, styrene is preferred but other polymerizable monovinyl aromatic compounds such as ortho-methyl styrene, para-methyl styrene, ortho-ethyl styrene, para-ethyl styrene, ortho-, para-dimethyl styrene, ortho,para-diethyl styrene, ortho-methyl-para-isopropyl styrene, etc., may be employed.

Alpha-methyl styrene is preferably used as the alpha-methylene alkyl aromatic component of the compositions. However, other alpha-methylene alkyl aromatic compounds such as para-methyl alpha-methyl styrene, alpha-ethyl styrene, ortho,para-dimethyl alpha-methyl styrene, or para-isopropyl alpha-methyl styrene, or mixtures of any of these compounds with one another, or with alpha-methyl styrene, may be used.

The polyhydric alcohol reactant should contain three or more hydroxyl groups. Examples of such polyhydric alcohols are glycerine, pentaerythritol, mannitol, sorbitol, trimethylolpropane and 2,2,6,6-tetramethylolcyclohexanol.

In preparing interpolymers of the drying oil fatty acid and a mixture consisting of a monovinyl aromatic compound and an alpha-methylene alkyl aromatic compound, the alpha-methylene alkyl aromatic compound, e. g. alpha-methyl styrene, may be used in amount corresponding to from 16.7 to 50, preferably from 20 to 40, per cent by weight of the combined weight of the alpha-methylene alkyl aromatic compound and the monovinyl aromatic compound, preferably styrene. The drying oil acid, or mixture of drying oil acids, may be employed in amount corresponding to from 30 to 90, preferably from 40 to 70, per cent by weight of the combined weight of the polymerizable materials, the monovinyl aromatic and alpha-methylene aromatic components making up the remaining per cent by weight of said materials to a total of 100 per cent.

The polymerizable starting materials are preferably polymerized in a closed container, or in contact with an inert atmosphere, e. g. nitrogen, or methane, etc., in the absence of an inert liquid media such as benzene, toluene, or xylene, etc. However, the polymerization may be carried out with limited access of air, e. g. by way of a reflux condenser, to the materials. In practice, the drying oil fatty acid, the monovinyl aromatic compound, e. g. styrene, and the alpha-methylene alkyl aromatic compound, preferably alpha-methyl styrene, are mixed together in the desired proportions and the mixture is heated at a temperature below its atmospheric boiling point until polymerization is substantially complete. The polymerization may be carried out at temperatures of from 120° to 300° C., but temperatures of from 150° to 200° C., are preferred. The mixture should not be heated to a temperature sufficient to cause decomposition of the product. Polymerization is usually complete after 10 to 50 hours of heating at the preferred temperatures.

The rate of polymerization may be increased by adding to the starting mixture a small amount, e. g. from 0.5 to 3 per cent by weight, of a polymerization catalyst such as benzoyl peroxide, acetyl benzoyl peroxide, tertiary butyl perbenzoate, or tertiary butyl hydroperoxide, etc.

The addition of a polymerization catalyst to the mixture is advantageous in that it permits production of clear interpolymers using the polymerizable starting materials in relative proportions which may be varied over somewhat wider ranges than is possible without the use of a catalyst.

In preparing certain of the interpolymers, particularly those in which a drying oil fatty acid having a low degree of conjugation, e. g. dehydrated castor oil fatty acids, the vinyl aromatic compound, e. g. styrene, and the alpha-methylene alkyl aromatic compound, preferably alpha-methyl styrene, are interpolymerized, the clarity and solubility of the interpolymers in toluene are materially affected by the manner in which the constituents are mixed together. Best results are frequently obtained when the drying oil acid, or mixture of drying oil acids, is first heated to a polymerization temperature and a mixture of the monovinyl aromatic compound, e. g. styrene, the alpha-methylene alkyl aromatic compound, e. g. alpha-methyl styrene, and a polymerization catalyst is added over a period of several hours.

The resinous polyhydroxy esters containing free hydroxyl groups are prepared by esterifying the herein described interpolymers with a polyhydric alcohol, e. g. glycerine, or pentaerythritol, etc., in amount sufficient to neutralize the free carboxylic acid groups of the drying oil fatty acids in the interpolymer and leave an amount of free hydroxyl groups corresponding to an average of from 1.5 to 2.5, preferably from 1.8 to 2.2, unreacted hydroxyl groups per polyhydric alcohol nucleus. In practice, the interpolymer is usually esterified with an amount of the polyhydric alcohol chemically equivalent to react with the carboxylic acid groups of the drying oil fatty acid, or mixture of drying oil fatty acids, and leave two unreacted hydroxyl groups, or the equivalent of two unreacted hydroxyl groups per polyhydric alcohol nucleus. Thus, when employing glycerine as the polyhydric alcohol and the drying oil acid is linseed oil fatty acids, the glycerine is preferably employed in amount of about 0.3 part by weight per part of the linseed oil fatty acids. In similar manner, when the polyhydric alcohol is pentaerythritol, it is preferably used in amount of about 0.24 part by weight per part of the linseed oil fatty acids. In carrying out the esterification reaction it is probable that a mixture of mono-, di-, and polyhydroxy esters are obtained. However, this is of little consequence provided that the average number of free hydroxyl groups in the resinous esterification product is equivalent to from 1.5 to 2.5 hydroxyl groups per polyhydric alcohol nucleus.

Esterification of the interpolymer with the polyhydric alcohol is preferably carried out in contact with an inert atmosphere, e. g. by passing a stream of nitrogen, or methane, etc., over the mixture of reactants. However, the esterification reaction may be carried out with limited access of air to the reactants such as by way of a gooseneck and condenser to remove volatile ingredients, including water, from the reaction mixture. In practice, the interpolymer and the polyhydric alcohol are mixed together in the desired proportions and the mixture is heated to a temperature of from 180° to 260° C., preferably from 200° to 240° C., until esterification is substantially complete. The esterification reaction is usually complete after 2 to 24 hours of heating at the preferred temperatures.

The new styrene modified alkyd resines of this invention are prepared by reacting the resinous polyhydroxy esters with phthalic acid, or phthalic anhydride, preferably the latter. The phthalic acid, or phthalic anhydride, is usually employed in amount chemically equivalent to the free hydroxyl groups in the resinous ester, although somewhat greater or lesser amounts may be used, e. g. an amount corresponding to 10 per cent greater than, or less than, a chemically equivalent proportion. In practice, the phthalic acid, or phthalic anhydride, in the desired proportions, is added to the polyhydric alcohol-interpolymer reaction product upon completion of the esterification reaction and the resulting mixture is heated to a temperature of from 230° to 260° C., preferably from 240° to 250° C., to effect a reaction between the free hydroxyl groups of the resinous ester and the phthalic acid, or the phthalic anhydride. The reaction is usually complete after 2 to 4 hours of heating at the latter temperatures.

The reaction of the polyhydroxy ester with the phthalic acid, or phthalic anhydride, is preferably carried out in an inert atmosphere, e. g. by bubbling a stream of nitrogen or carbon dioxide, through the reactants, although the reaction may be carried out with limited access of air to the reactants. In this latter instance, the resinous products are usually somewhat darker in color than those obtained when oxygen or air is excluded. Unreacted phthalic acid, or phthalic anhydride may be removed from the reaction product by blowing the same with an inert gas, e. g. nitrogen, or carbon dioxide.

The following examples illustrate practice of the invention, but are not to be construed as limiting the scope thereof.

*Example 1*

A mixture consisting of 34.1 parts by weight of fatty acids of dehydrated castor oil, 23.9 parts of styrene, 10.2 parts of alpha-methyl styrene and 2 parts of benzoyl peroxide as polymerization catalyst, was placed in a reaction flask equipped with a condenser and stirrer. The mixture was stirred and heated to a temperature of 150° to 170° C. for a period of 3 hours. Thereafter, 12.8 parts of glycerine was added to the interpolymer and the mixture heated to a temperature of 200° C. for a period of 21 hours. 17.0 parts of phthalic anhydride was then added to the glycerine-interpolymer reaction product and the resulting mixture heated to a temperature of 245° C., for a period of 4 hours. During the reactions just described volatile ingredients, including water, were removed from the reaction mixtures by vaporization and condensation. The reaction product was a yellow viscous liquid having an acid number of 21.5.

A varnish was prepared by dissolving one part by weight of the resin in one part of a solvent consisting of two parts by weight of mineral spirits (an aliphatic hydrocarbon varnish solvent) and one xylene, and adding as driers 0.02 per cent cobalt, 0.005 per cent manganese and 0.15 per cent lead as the naphthenates, together with 0.1 per cent guiacol to prevent skinning. The varnish had a viscosity of B-C (Gardner-Holdt scale) and a color of 9-10 (Gardner). Films of this varnish were clear, and hard. The films show good adhesion to metal, excellent durability and good resistance to mineral spirits and to aqueous solutions of soap and alkali.

*Example 2*

A mixture consisting of 25.4 parts by weight of fatty acids of dehydrated castor oil, 35 parts of styrene, 15 parts of alpha-methyl styrene and 2 parts of benzoyl peroxide as polymerization catalyst was placed in a reaction flask equipped with a condenser and stirrer. The mixture was stirred and heated to a temperature of from 150° to 170° C. for a period of 3 hours. Thereafter, 9.2 parts of glycerine was added to the interpolymer and the mixture heated to a temperature of 200° C., for a period of 3 hours. 13.4 parts of phthalic anhydride was then added to the interpolymer glyceride and the resulting mixture heated to a temperature of 245° C., for a period of 2 hours. The product was a pale yellow semi-solid having an acid number of 10.3. A varnish made by dissolving one part by weight of the resin in one part of the solvent mixture of Example 1 had a viscosity of E-F (Gardner-Holdt) and a color of 5-6 (Gardner). Films of this varnish were slightly hazy. The films show good adhesion to metal, resistance to abrasion and good resistance to mineral spirits.

*Example 3*

A mixture consisting of 48 parts by weight of fatty acids of dehydrated castor oil, 17.5 parts of styrene, 7.5 parts of alpha-methyl styrene and 2 parts of benzoyl peroxide as polymerization catalyst was placed in a reaction flask equipped with a condenser and stirrer. The mixture was stirred and heated to a temperature of from 150° to 170° C., over a period of 3 hours. Thereafter, 12.5 parts of pentaerythritol was added to the interpolymer and the mixture heated to a temperature of 200° C., for 21 hours longer. 12.5 parts of phthalic anhydride was then added to the resinous hydroxy ester and the resulting mixture heated to a temperature of 245° C., for a period of 4 hours. The product was a yellow semi-solid.

A varnish was prepared by dissolving 60 parts by weight of the resin in 40 parts of the solvent mixture of Example 1 and adding as driers 0.02 per cent cobalt and 0.15 per cent lead as the naphthenates. The varnish had a viscosity of G (Gardner-Holdt) and a color of 8-9 (Gardner). Films of this varnish were clear and tough. The films show good adhesion to metal, excellent color retention, and good resistance to mineral spirits and to aqueous soap solutions.

*Example 4*

A mixture consisting of 32 parts by weight of fatty acids of dehydrated castor oil, 35 parts of styrene, 15 parts of alpha-methyl styrene and 2 parts of benzoyl peroxide as polymerization catalyst was interpolymerized by heating the same at temperatures between 150° and 170° C., over a period of 9 hours. Thereafter, 8 parts of pentaerythritol was added to the interpolymer and the mixture heated at a temperature of 200° C. for a period of 4 hours longer. 8.0 parts of phthalic anhydride was then added to the hydroxylated interpolymer and the mixture heated to a temperature of 245° C. for a period of 4 hours. The product on cooling to room temperature was a brown semi-solid.

A varnish was prepared from the resin by procedure described in Example 3. The varnish had a viscosity of I-J (Gardner-Holdt) and a color of 9-10 (Gardner). Films of this varnish were tough and hard. The varnish drys in air or by baking to form clear films having good color retention, excellent durability and good resistance to mineral spirits and to aqueous solutions of soap and alkali.

Other modes of applying the principle of the invention may be employed instead of those explained, change being made in the method or products herein disclosed, provided the steps or substances stated by any of the following claims

We claim:

1. In a method of making a styrene modified alkyd resin, the steps of esterifying a toluene-soluble interpolymer of from 30 to 90 parts by weight of a drying oil fatty acid and from 70 to 10 parts of a mixture consisting of from 50 to 80 per cent by weight of a monovinyl aromatic compound having the formula:

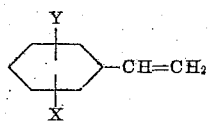

and from 50 to 20 per cent of an alpha-methylene alkyl aromatic compound having the formula:

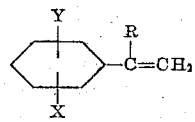

in which formulas X and Y each represents a member of the group consisting of hydrogen and lower alkyl radicals containing not more than 3 carbon atoms and R is an alkyl radical containing not more than 2 carbon atoms, with a polyhydric alcohol in amount sufficient to neutralize the carboxylic acid groups of the drying oil fatty acid and leave an average of from 1.5 to 2.5 free hydroxyl groups per polyhydric alcohol nucleus, by heating the mixture at a temperature of from 200° to 240° C., to form a resinous ester containing free hydroxyl groups, thereafter mixing the polyhydroxy ester with a chemically equivalent proportion of phthalic anhydride and heating the mixture at a temperature of from 230° to 260° C.

2. In a method of making a styrene modified alkyd resin, the steps of interpolymerizing from 30 to 90 parts by weight of a drying oil fatty acid and from 70 to 10 parts of a mixture consisting of from 50 to 80 per cent by weight of a monovinyl aromatic compound having the formula:

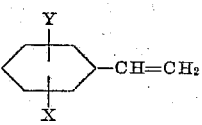

and from 50 to 20 per cent of an alpha-methylene alkyl aromatic compound having the formula:

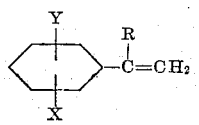

in which formulas X and Y each represents a member of the group consisting of hydrogen and lower alkyl radicals containing not more than 3 carbon atoms and R is an alkyl radical containing not more than 2 carbon atoms, by heating the mixture of polymerizable materials at a temperature of from 120° to 300° C., esterifying the interpolymer with a polyhydric alcohol in amount sufficient to neutralize the carboxylic acid groups of the drying oil fatty acid and leave an average of from 1.5 to 2.5 free hydroxyl groups per polyhydric alcohol nucleus, by heating the mixture of said interpolymer and polyhydric alcohol at a temperature of from 200° to 240° C., to form a resinous ester containing free hydroxyl groups, thereafter mixing the polyhydroxy ester with a chemically equivalent proportion of phthalic anhydride and heating the mixture at a temperature of from 230° to 260° C.

3. In a method of making a styrene modified alkyd resin, the steps of esterifying an interpolymer of from 30 to 90 parts by weight of a drying oil fatty acid and from 70 to 10 parts of a mixture consisting of from 50 to 80 per cent by weight of styrene and from 50 to 20 per cent of alpha-methyl styrene, with a polyhydric alcohol in amount sufficient to neutralize the carboxylic acid groups of the drying oil fatty acid and leave an average of from 1.5 to 2.5 free hydroxyl groups per polyhydric alcohol nucleus, by heating the mixture of reactants at a temperature of from 200° to 240° C., to form a resinous ester containing free hydroxyl groups, thereafter mixing the polyhydroxy ester with a chemically equivalent proportion of phthalic anhydride and heating the mixture at a temperature of from 230° to 260° C.

4. In a method of making a styrene modified alkyd resin, the steps of interpolymerizing from 30 to 90 parts by weight of a drying oil fatty acid and from 70 to 10 parts of a mixture consisting of from 50 to 80 per cent by weight of styrene and from 50 to 20 per cent of alpha-methyl styrene by heating the mixture of polymerizable materials at a temperature of from 150° to 200° C., esterifying the interpolymer with a polyhydric alcohol in amount sufficient to neutralize the carboxylic acid groups of the drying oil fatty acid and leave an average of from 1.8 to 2.2 free hydroxyl groups per polyhydric alcohol nucleus, by heating the mixture of said interpolymer and polyhydric alcohol at a temperature of from 200° to 240° C., to form a resinous ester containing free hydroxyl groups, thereafter mixing the polyhydroxy ester with a chemically equivalent proportion of phthalic anhydride and heating the mixture at a temperature of from 230° to 260° C.

5. A toluene-soluble resinous film forming composition composed of a phthalate of a resinous ester containing free hydroxyl groups resulting from the esterification at temperatures of from 200° to 240° C., of an interpolymer of from 30 to 90 parts by weight of a drying oil fatty acid and from 70 to 10 parts of a mixture consisting of 50 to 80 per cent by weight of a monovinyl aromatic compound having the formula:

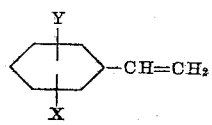

and from 50 to 20 per cent of an alpha-methylene alkyl aromatic compound having the formula:

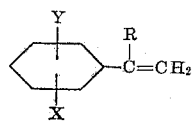

in which formulas X and Y each represents a member of the group consisting of hydrogen and lower alkyl radicals containing not more than 3 carbon atoms and R represents an alkyl radical containing not more thant 2 carbon atoms, with a polyhydric alcohol in amount sufficient to neutralize the carboxylic acid groups in the interpolymer and leave an average of from 1.5 to 2.5 free hydroxyl groups per polydric alcohol nucleus, 6. A toluene-soluble resinous film forming composition composed of a phthalate of a resinous ester containing free hydroxyl groups resulting from the esterification at temperatures of from 200° to 240° C., of an interpolymer of from 30 to 90 parts by weight of a drying oil acid and from 70 to 10 parts of a mixture consisting of from 50 to 80 per cent by weight of styrene and from 50 to 20 per cent of alpha-methyl styrene, with a polyhydric alcohol in amount sufficient to neutralize the carboxylic acid groups in the interpolymer and leave an average of from 1.5 to 2.5 free hydroxyl groups per polyhydric alcohol nucleus.

7. A toluene-soluble resinous film forming composition as described in claim 6, wherein the drying oil acid is linseed oil fatty acids.

8. A toluene-soluble resinous film forming composition as described in claim 6, wherein the drying oil acid is dehydrated castor oil fatty acids.

9. A toluene-soluble resinous film forming composition as described in claim 6, wherein the drying oil acid is tung oil fatty acids.

10. A toluene-soluble resinous film forming composition as described in claim 6, wherein the drying oil acid is dehydrated castor oil fatty acids and the polyhydric alcohol is pentaerythritol in amount of from 0.20 to 0.25 part by weight per part of drying oil fatty acids.

11. A toluene-soluble resinous film forming composition as described in claim 6, wherein the drying oil acid is a mixture consisting of tung oil fatty acids and soybean oil fatty acids.

GERALD A. GRIESS.
CARL V. STRANDSKOV.

References Cited in the file of this patent

UNITED STATES PATENTS

| Number | Name | Date |
| --- | --- | --- |
| 2,190,915 | Bass et al. | Feb. 20, 1940 |
| 2,320,724 | Gerhart et al. | June 1, 1943 |
| 2,392,710 | Wakeford et al. | Jan. 8, 1946 |
| 2,468,748 | Griess et al. | May 3, 1949 |
| 2,470,752 | Bobalek | May 24, 1949 |
| 2,560,592 | Opp et al. | July 17, 1951 |